United States Patent
Maynard

(10) Patent No.: US 10,683,839 B2
(45) Date of Patent: Jun. 16, 2020

(54) AIR-DRIVEN GENERATOR

(71) Applicant: Mark J. Maynard, Easthampton, MA (US)

(72) Inventor: Mark J. Maynard, Easthampton, MA (US)

(*) Notice: Subject to any disclaimer, the term of this patent is extended or adjusted under 35 U.S.C. 154(b) by 0 days.

(21) Appl. No.: 16/115,531

(22) Filed: Aug. 28, 2018

(65) Prior Publication Data

US 2019/0063396 A1   Feb. 28, 2019

Related U.S. Application Data

(60) Provisional application No. 62/550,836, filed on Aug. 28, 2017.

(51) Int. Cl.

| | | |
|---|---|---|
| F03B 17/00 | (2006.01) | |
| F03B 17/02 | (2006.01) | |
| F03D 9/28 | (2016.01) | |
| F03D 9/25 | (2016.01) | |
| F03D 9/14 | (2016.01) | |
| F03D 9/17 | (2016.01) | |
| F03D 9/11 | (2016.01) | |

(52) U.S. Cl.
CPC ............ *F03B 17/005* (2013.01); *F03B 17/02* (2013.01); *F03D 9/11* (2016.05); *F03D 9/14* (2016.05); *F03D 9/17* (2016.05); *F03D 9/25* (2016.05); *F03D 9/28* (2016.05); *F05B 2210/18* (2013.01); *F05B 2210/401* (2013.01)

(58) Field of Classification Search
CPC .......... F03B 17/005; F03B 17/02; F03D 9/14; F03D 9/17; F03D 9/28; F05B 2210/401; F05B 2210/18

USPC ........ 290/54, 43; 60/398; 417/137, 108, 150
See application file for complete search history.

(56) References Cited

U.S. PATENT DOCUMENTS 2,298,984 A   10/1942   Stinson et al.
3,002,923 A   10/1961   Barker et al.
(Continued)

FOREIGN PATENT DOCUMENTS

CN   101149039 A   3/2008
GB   2318393   4/1998
(Continued)

*Primary Examiner* — Julio C. Gonzalez
(74) *Attorney, Agent, or Firm* — Nutter McClennen & Fish LLP

(57) ABSTRACT

An air-driven generator for generating electric power from movement of a working fluid. Upper ends of buoyancy conduits are in fluidic communication with an upper end of a gravitational distribution conduit, and a lower end of the gravitational distribution conduit is in fluidic communication with lower ends of the buoyancy conduits. An air injection system injects air into the buoyancy conduits. A closed fluid loop is formed with working fluid flowing from the gravitational distribution conduit driving a fluid turbine system that is interposed between the lower ends of the gravitational distribution conduit and the buoyancy conduits. Flow of working fluid can be induced by an injection of air into working fluid disposed in the buoyancy conduits to achieve a generation of power by actuation of the fluid turbine system. An upper chamber can remove entrained air. A Rankin Cycle Generator can receive and be actuated by exhausted air.

36 Claims, 12 Drawing Sheets

(56) References Cited

U.S. PATENT DOCUMENTS

| | | | |
|---|---|---|---|
| 3,360,926 A | | 1/1968 | Parr |
| 3,850,817 A | | 11/1974 | Barthel |
| 3,984,698 A | | 10/1976 | Brewer |
| 4,041,710 A | * | 8/1977 | Kraus .................. F01K 27/005 60/673 |
| 4,135,364 A | * | 1/1979 | Busick ................. F03B 17/005 290/54 |
| 4,266,402 A | | 5/1981 | Pruett |
| 4,326,132 A | | 4/1982 | Bokel |
| 4,392,062 A | | 7/1983 | Bervig |
| 4,430,858 A | * | 2/1984 | Shaw .................... F03B 17/02 417/159 |
| 4,742,242 A | | 5/1988 | De Shon |
| 4,767,938 A | * | 8/1988 | Bervig ................. F03B 17/005 290/1 R |
| 4,800,727 A | | 1/1989 | Petrick |
| 4,832,578 A | | 5/1989 | Putt |
| 4,947,647 A | | 8/1990 | Jensen |
| 5,899,066 A | | 5/1999 | Brassea-Flores |
| 6,223,532 B1 | | 5/2001 | Brassea-Flores |
| 6,447,243 B1 | | 9/2002 | Kittle |
| 6,990,809 B2 | | 1/2006 | Abouraphael |
| 7,222,487 B1 | | 5/2007 | Hinkley |
| 7,226,895 B2 | | 6/2007 | Xiang |
| 7,584,610 B2 | * | 9/2009 | Ziegenfuss .......... F03B 17/005 60/398 |
| 8,667,798 B2 | | 3/2014 | Hopper et al. |
| 8,813,488 B2 | | 8/2014 | Gibson et al. |
| 9,587,162 B2 | | 3/2017 | Fisk, Jr. |
| 9,856,850 B1 | * | 1/2018 | Sheehan .............. F03B 17/005 |
| 2002/0083708 A1 | | 7/2002 | Kono et al. |
| 2006/0236698 A1 | | 10/2006 | Langson |
| 2008/0303282 A1 | | 12/2008 | Ziegenfuss |
| 2009/0127866 A1 | | 5/2009 | Cook |
| 2010/0146961 A1 | | 6/2010 | Silva |
| 2011/0049899 A1 | | 3/2011 | Hoffman |
| 2012/0090312 A1 | | 4/2012 | Wilson et al. |
| 2014/0197642 A1 | | 7/2014 | Daya |
| 2014/0250879 A1 | * | 9/2014 | Moncada ............ F03B 17/005 60/495 |

FOREIGN PATENT DOCUMENTS

| | | |
|---|---|---|
| WO | WO2012017243 A1 | 2/2012 |
| WO | WO2012079171 A1 | 6/2012 |
| WO | WO2014110160 A3 | 7/2014 |

* cited by examiner

AIR-DRIVEN GENERATOR

RELATED APPLICATION

This application claims priority to Provisional Application No. 62/550,836, filed Aug. 28, 2017, which is incorporated herein by reference.

FIELD OF THE INVENTION

The present invention relates generally to energy conversion apparatuses. More particularly, disclosed herein is an electrical energy generation system for inducing cyclic movement of a working fluid within a closed-loop system through the injection of air into plural buoyancy conduits to yield upward flow of the working fluid within the plural buoyancy conduits by movement of entrained air and downward flow of the working fluid within a central gravitational distribution conduit to drive a fluid turbine system thereby to generate electrical energy from the energy of the flowing working fluid.

BACKGROUND OF THE INVENTION

The need for alternative sources of energy is well-recognized and ever-increasing. Innumerable skilled inventors have contributed to advances in alternative energy power generation. Systems and methods have been disclosed for harvesting energy from the Sun, from the wind, and from the movement of rivers and other bodies of water. With each advance in alternative energy, the need for fossil fuels is reduced and humankind's negative impact on the environment diminished.

It is further known to attempt to harvest energy by introducing a gas into a column of liquid to induce entrained movement of the liquid with the upward movement of the gas due to its buoyancy and then to harness the kinetic and potential energy of the moving liquid, such as through a fluid turbine. For instance, in U.S. Patent Application Publication No. 2008/0303282 of Ziegenfuss, a water cycling system is taught wherein an air compressor is used as a motive force and a turbine is used for electric power generation. A water piping subsystem establishes a circuitous loop with one upward flowing side and one downward flowing side. The air compressor injects air into a lower portion of the upward flowing side to induce entrained flow of the water, and a turbine disposed in the downward flowing side receives flowing water to convert the kinetic energy therein to electric power. In a similar vein, U.S. Pat. No. 4,392,062 to Bervig discloses disposing an electrical generating device within the flow of a U-shaped conduit with an injector for injecting a lower density substance into fluid within one leg of the U-shaped conduit to produce a flow of the fluid. The flow of the fluid actuates the electrical generating device so that the energy within the moving fluid is harvested into electric power. Still further, International Publication No. WO2014110160 of Markie et al. is directed to a System for Generating Electricity wherein a first fluid within a holding tank receives a less dense second fluid to induce an upward flow of the first fluid within an elongate housing. The flow of the first fluid induces rotation of a turbine thereby yielding electrical energy.

While the foregoing advances in alternative energy are useful, they do suffer from a number of limitations and critical disadvantages. For instance, without the Sun, photovoltaics are of little effect. Wind turbines operate only in sufficient winds, are prone to malfunction, and are expensive to maintain. Still further, wave power generators and river turbines can be installed and operated only where the body of water exists and are themselves dependent on the flow and movement of naturally moving water.

Still further, prior art cyclical power generation systems induced into operation by the injection of a buoyant fluid within a working fluid have exhibited limitations in effectiveness and operation that have heretofore prevented widespread adoption. Many such motive fluid power generators exhibit high losses in power and are highly inefficient. Such previously disclosed motive fluid power generation systems are limited by, among other things, the reliance on a single column of working fluid to be induced into cyclical movement. Furthermore, motive fluid power generation systems of the prior art have demonstrated little ability or recognition of the need for enhancing the density of the working fluid prior to downward cyclical movement of the same by actively removing entrained buoyancy fluid. Additionally, many prior art motive fluid power generation systems are highly complex in structure and operation and are entirely reliant on a single flow path. Accordingly, failure or required maintenance of components of the system are common and result in a complete system shutdown.

In view of the foregoing, it will be recognized that, despite the useful efforts of many skilled inventors, there remains a need in the art for an alternative energy power generation system that does not rely on any outside factors, that can be installed and continuously operated in widely varied locations, and that is sufficiently efficient in operation to represent an advance in humankind's ability to generate available electric power.

SUMMARY OF THE INVENTION

The present invention is thus founded on the basic object of providing an alternative energy power generation system that overcomes the limitations of the prior art to provide a viable source of electric power.

A more particular object of the invention is to provide a power generation system that operates at high efficiency.

A further particular object of the invention is to provide a power generation system that exhibits reduced reliance on outside factors such that the power generation system can be installed and operated in substantially any location.

Still another object of embodiments of the invention is to provide a power generation system that can be operated substantially continuously with minimized maintenance requirements and reduced system-wide shutdowns.

These and further objects and advantages of the present invention will become obvious not only to one who reviews the present specification and drawings but also to those who have an opportunity to experience an embodiment of the air-driven generator disclosed herein. It will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, the power generation system comprises an air-driven generator for generating electric power from movement of a working fluid. The air-driven generator can have an elongate gravitational distribution conduit with an upper end and a lower end and plural elongate buoyancy conduits, each buoyancy conduit with an upper end and a lower end. The upper ends of the buoyancy conduits are in fluidic communication with the upper end of the gravitational distribution conduit. The lower end of the gravitational distribution conduit is in fluidic communication with the lower ends of the plural buoyancy conduits. A closed fluid loop is formed between the buoyancy conduits and the gravitational distribution conduit. Working fluid flowing from the upper ends of the buoyancy conduits will be fed into the upper end of the gravitational distribution conduit, and working fluid flowing downwardly through the gravitational distribution conduit will be fed from the lower end of the distributor conduit into the lower ends of the plural buoyancy conduits. A fluid turbine system is fluidically interposed between the lower end of the gravitational distribution conduit and the lower ends of the buoyancy conduits, and an air injection system is operative to inject air into each of the buoyancy conduits. Under such constructions of the air-driven generator, an injection of air into working fluid disposed in the buoyancy conduits will tend to induce upward flow of the working fluid in the buoyancy conduits, and working fluid fed to the upper end of the gravitational distribution conduit will tend to have a downward flow within the gravitational distribution conduit to actuate the fluid turbine system.

In certain practices of the invention, the air injection system comprises one or more air injectors coupled to each buoyancy conduit in combination with a source of compressed air coupled to the one or more air injectors coupled to each buoyancy conduit. The source of compressed air could, for instance, be an air compressor some other source of compressed air. The source of compressed air could, in particular embodiments, include a system of alternating mechanical compressors and heat pumps.

Embodiments of the air-driven generator can further include an upper chamber. The upper ends of the buoyancy conduits can then be in fluidic communication with the upper end of the gravitational distribution conduit through the upper chamber. Where included, the upper chamber can have a substantially annular sidewall. The upper end of each buoyancy conduit can meet the upper chamber in a non-radial direction. For instance, the upper ends of the buoyancy conduits can meet the upper chamber in an at least partially tangential direction. Even more particularly, the upper ends of the buoyancy conduits could meet the upper chamber in approximately equal non-radial angles in series. Under such embodiments, working fluid exhausted from the upper ends of the buoyancy conduits will tend to follow an initial rotary pattern within the upper chamber. The upper chamber can thus be operative to remove air entrained within working fluid received into the chamber thereby to contribute to the efficiency of the generator by causing working fluid received into the upper end of the gravitational distribution conduit to retain a reduced volume of air.

Still further, it is contemplated that a baffle structure can be disposed within the upper chamber. The baffle structure, such as a structure with a plurality of baffle plates, can assist in removing entrained air from the working fluid.

Embodiments of the air-driven generator are disclosed wherein the gravitational distribution conduit has a longitudinal centerline and the buoyancy conduits are centered about the longitudinal centerline. Furthermore, embodiments of the invention can dispose the buoyancy conduits and the gravitational distribution conduit in substantially parallel dispositions. For instance, where four buoyancy conduits are employed, the buoyancy conduits can be disposed in a symmetrical, square configuration.

In practices of the air-driven generator, the lower end of the gravitational distribution conduit is in fluidic communication with the lower ends of the plural buoyancy conduits through a fluid distributor disposed at the bottom end of the gravitational distribution conduit in combination with fluidic return connections. Even further, heat exchanger can be interposed between the lower end of the gravitational distribution conduit and the lower ends of the buoyancy conduits.

It is further disclosed that the fluid turbine system could include a fluid turbine fluidically interposed between the lower end of the gravitational distribution conduit and the lower end of each buoyancy conduit. For instance, where four buoyancy conduits are employed, four fluid turbines can be provided, one fluidically coupled each buoyancy conduit to the gravitational distribution conduit.

Working fluid disposed within the closed fluid loop formed between the buoyancy conduits and the gravitational distribution conduit can be denser than water. For instance, the working fluid can have a specific gravity relative to water of greater than one, preferably greater than two.

The air-driven system can include a framework. The buoyancy conduits and the gravitational distribution conduit can then be retained by the framework to form a superstructure. Superstructures formed by the buoyancy conduit and the gravitational distribution conduit are contemplated with heights in excess of eighty feet and as much as thousands of feet, such as by being integrated into a building structure. The air-driven system can be freestanding or coupled to any structure.

Where the air-driven generator includes an upper chamber with the upper ends of the buoyancy conduits in fluidic communication with the upper end of the gravitational distribution conduit through the upper chamber, an air vent can be disposed in the upper chamber for permitting a release of air injected from the air injection system and exhausted from the upper ends of the buoyancy conduits. It is further disclosed that, in such embodiments, an Organic Rankin Cycle Generator can be disposed to receive air exhausted from the air vent of the upper chamber thereby further increasing the efficiency of the system.

One will appreciate that the foregoing discussion broadly outlines certain more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention. It will thus be clear that additional features and benefits of the invention will be apparent through a reading of the detailed description of implementations and embodiments, which are without restriction, and by reference to the attached figures.

BRIEF DESCRIPTION OF DRAWINGS

Additional details and features of the air-driven generator disclosed herein will be apparent to one skilled in the art after reviewing the present specification and drawings, wherein.

DETAILED DESCRIPTION OF PREFERRED EMBODIMENTS

The air-driven generator disclosed herein is subject to varied embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention.

Figure 1:
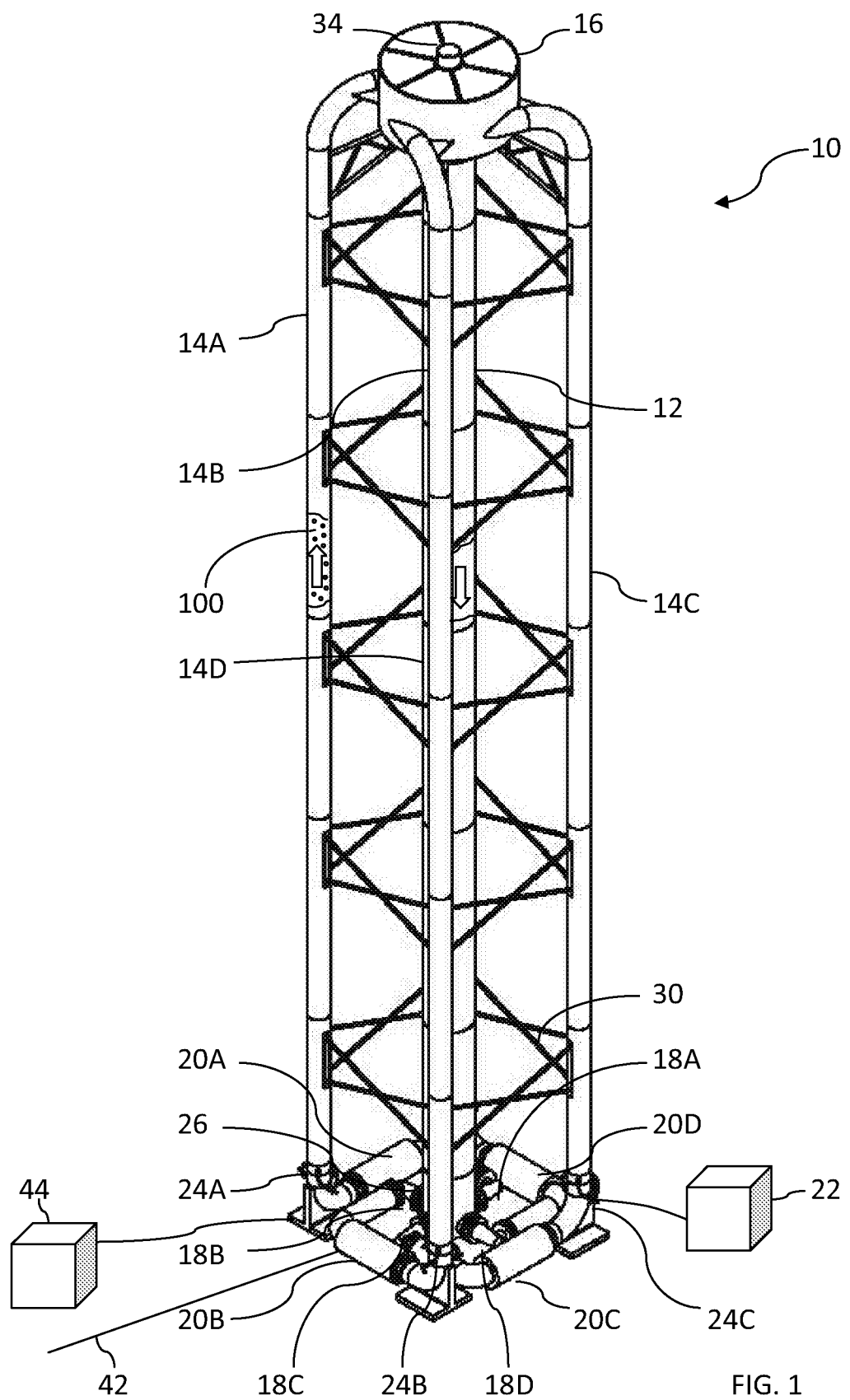
FIG. 1 is a perspective view of an air-driven generator according to the invention.
Figure 2:
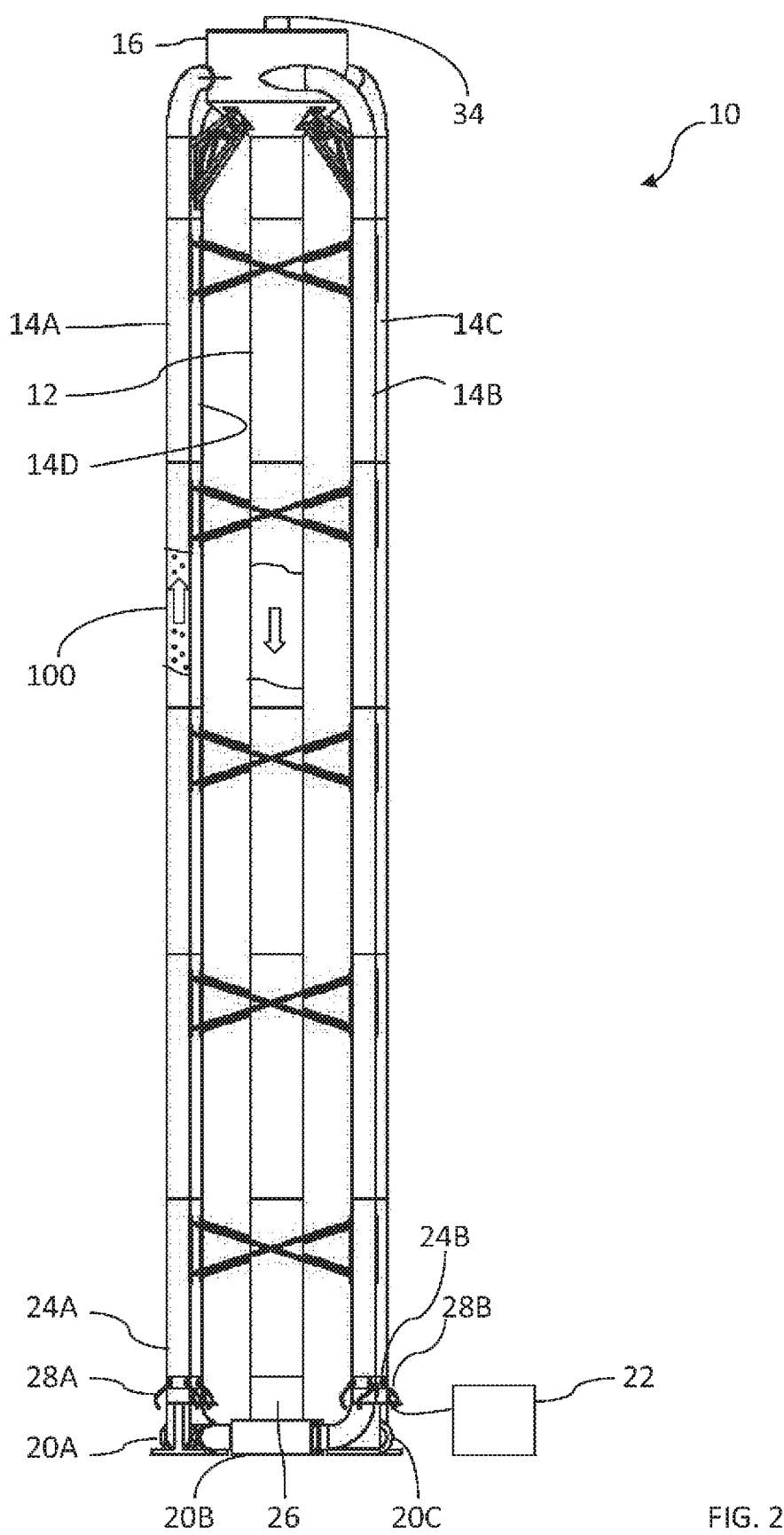
FIG. 2 is a view in front elevation of the air-driven generator.
Figure 3:
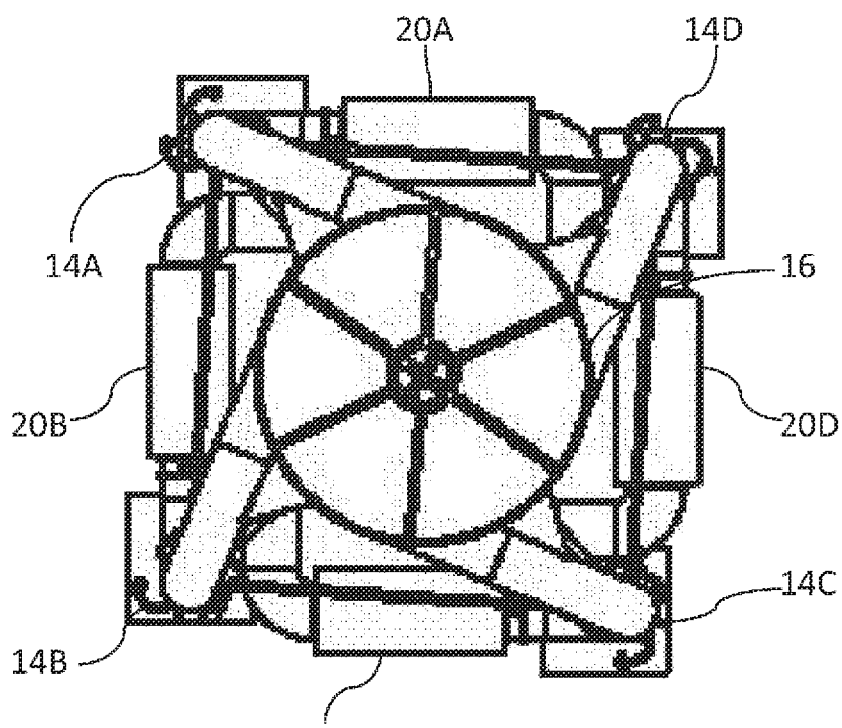
FIG. 3 is a top plan view of the air-driven generator.
Figure 4:
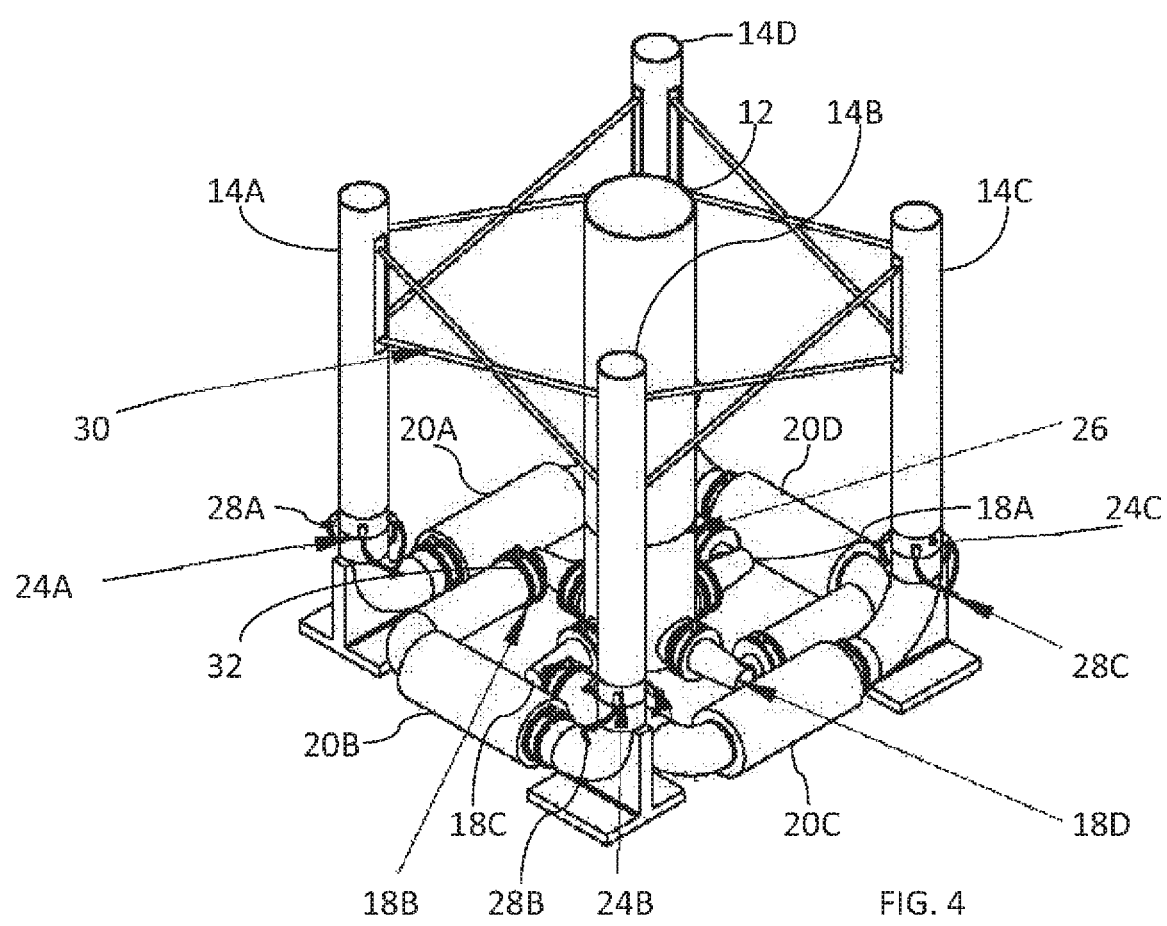
FIG. 4 is a perspective view of a base portion of the air-driven generator.

With this in mind and looking more particularly to the accompanying figures, an embodiment of the air-driven generator disclosed herein is indicated generally at 10 in FIGS. 1 and 2. There, the air-driven generator 10 has a closed-loop fluidic system with an elongate gravitational distribution conduit 12 fluidically coupled to a plurality of elongate buoyancy conduits 14A, 14B, 14C, and 14D. In the depicted embodiment, the buoyancy conduits 14A, 14B, 14C, and 14D and the gravitational distribution conduit 12 are retained in a mutually parallel relationship by a framework 30 to form a superstructure. Four buoyancy conduits 14A through 14D are included in this illustrative example with it being understood that fewer or more buoyancy conduits 14A through 14D could be employed.

The air-driven generator 10 can be constructed, installed, and operated with the buoyancy conduits 14A, 14B, 14C, and 14D and the gravitational distribution conduit 12 having vertical dispositions such that each conduit 12 and 14A through 14D has an upper end and a lower end. The upper ends of the buoyancy conduits 14A through 14D are in fluidic communication with the upper end of the gravitational distribution conduit 12 through an upper chamber 16 relative to which each of the conduits 12 and 14A through 14D is fluidically open. The lower end of the gravitational distribution conduit 12 is in fluidic communication with the lower ends of the plural buoyancy conduits 14A through 14D by a fluid distributor 26 at the bottom end of the central distributor conduit 12 and fluidic return connections. The fluidic return connections in the depicted embodiment include heat exchangers 20A through 20D. The gravitational distribution conduit 12 and the buoyancy conduits 14A through 14D in this exemplary practice of the invention are tubular, but it will be understood that other cross-sectional shapes are possible.

Under this construction, a closed fluid loop is formed. Fluid flowing upwardly through the buoyancy conduits 14A through 14D will be fed from the upper ends of the buoyancy conduits 14A through 14D, into the upper chamber 16, and into the upper end of the gravitational distribution conduit 12. Fluid flowing downwardly through the gravitational distribution conduit 12 will be fed from the lower end of the distributor conduit 12 and into the lower ends of the plural buoyancy conduits 14A through 14D through the fluidic coupling with the distributor conduit 12.

Figure 5:
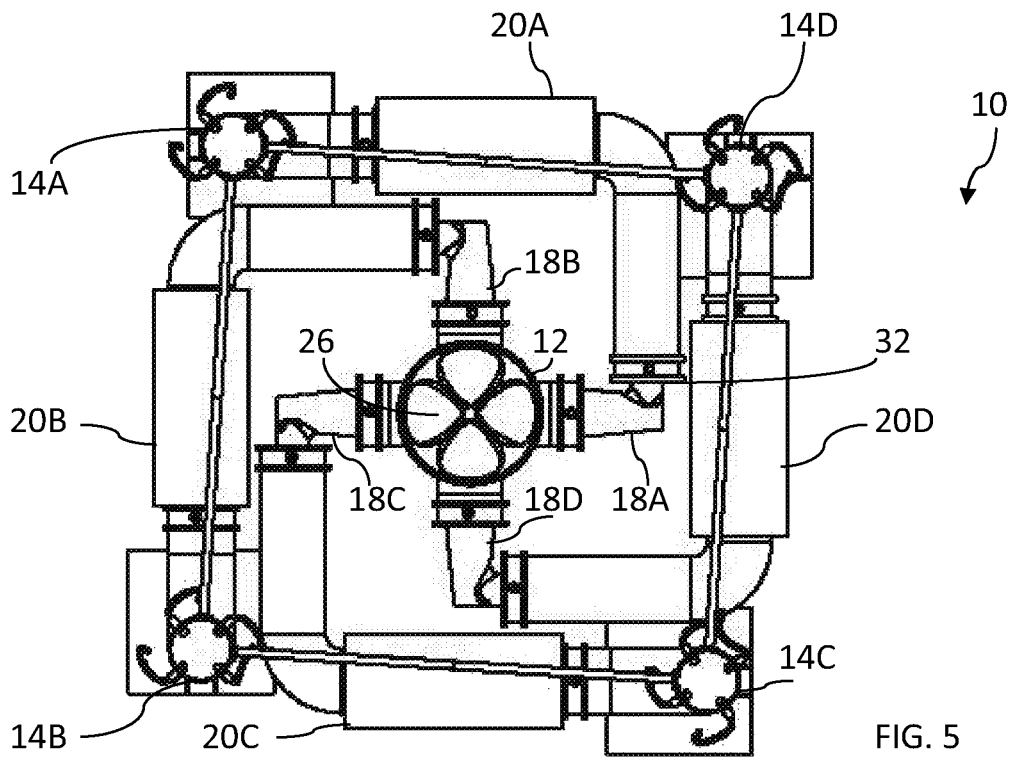
FIG. 5 a partially-sectioned top plan view of the air driven generator.
Figure 6:
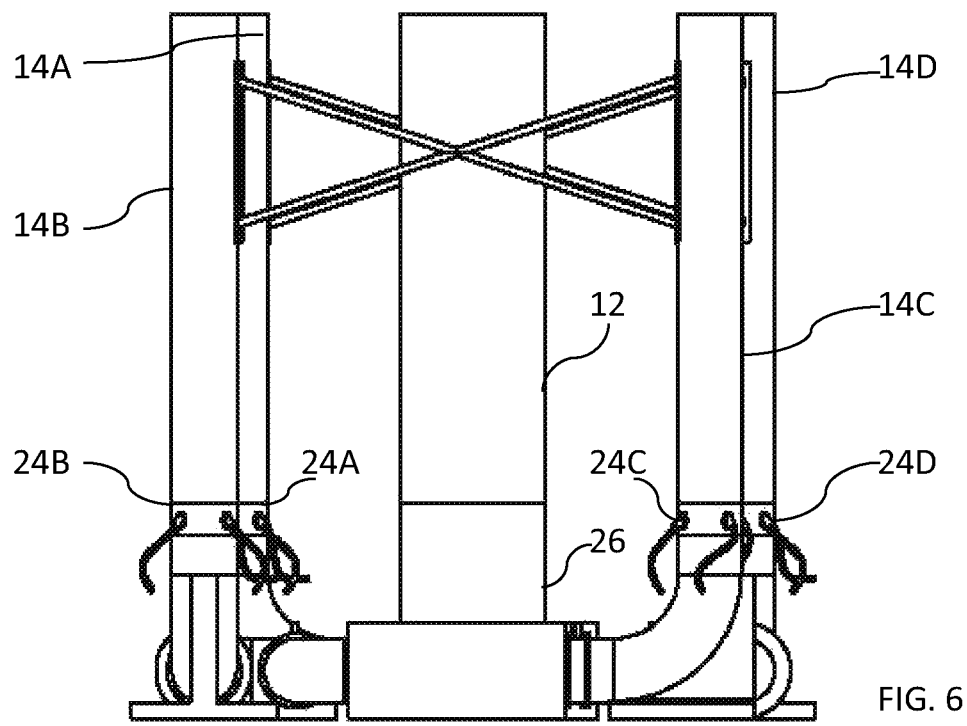
FIG. 6 a view in front elevation of the base portion of the air-driven generator.
Figure 7:
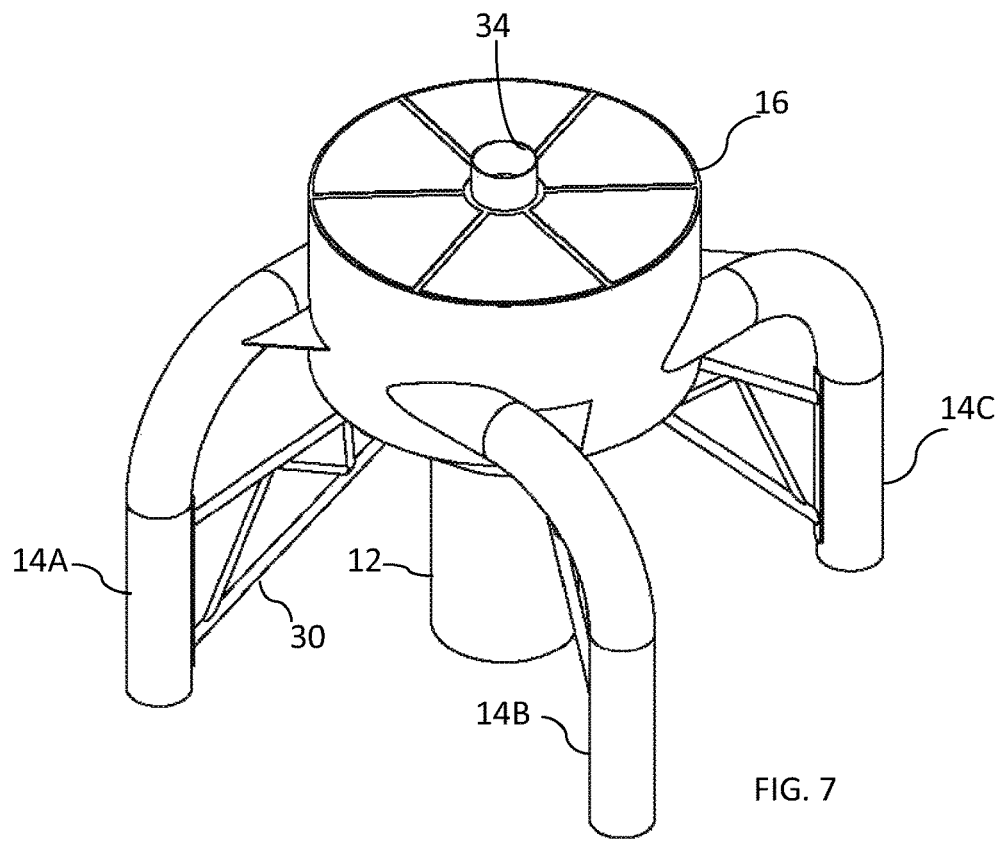
FIG. 7 is a perspective view of an upper portion of the air-driven generator.
Figure 8:
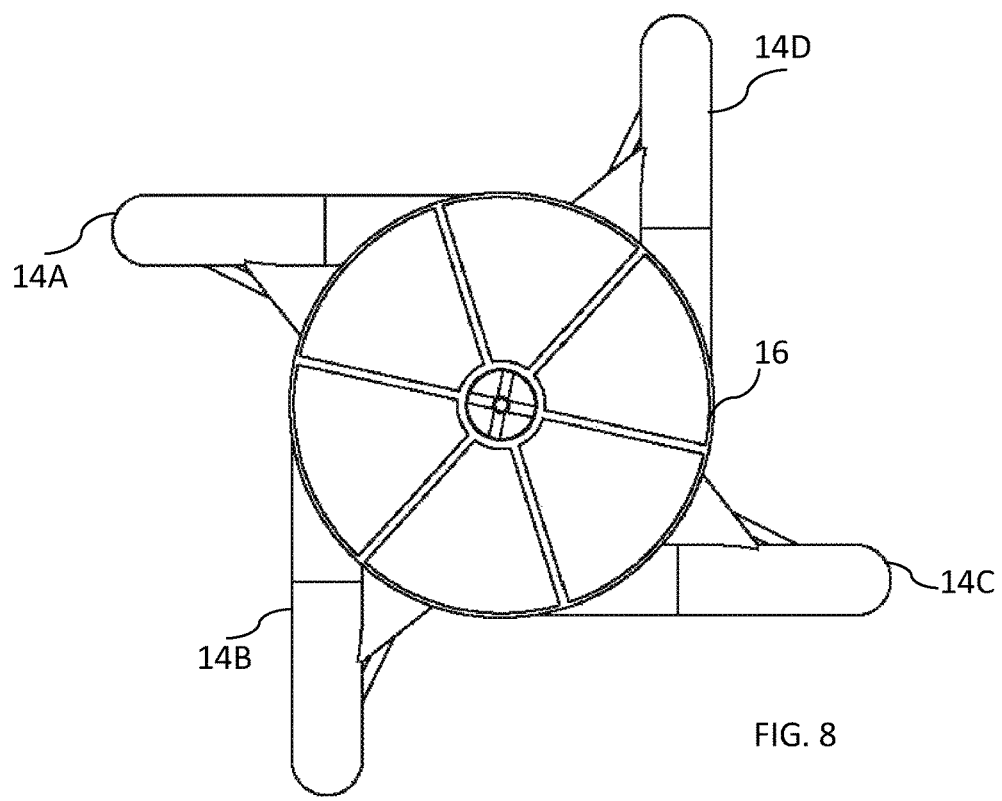
FIG. 8 a top plan view of the upper portion of the air driven generator.
Figure 9:
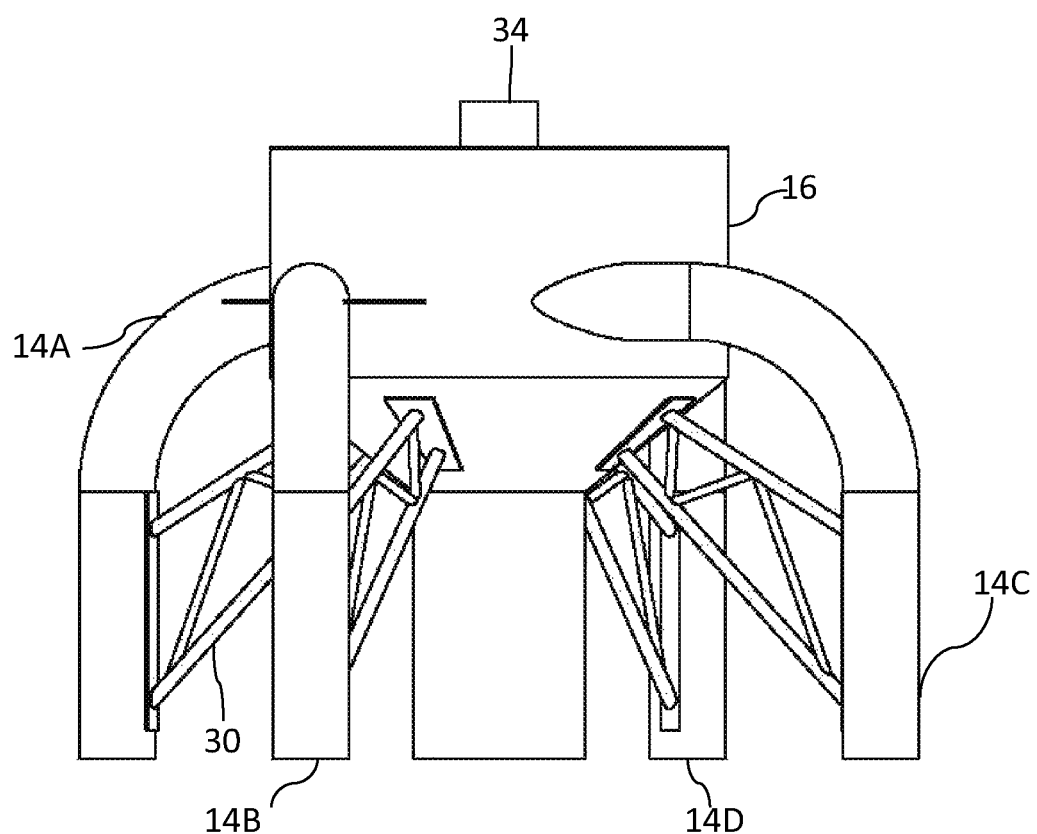
FIG. 9 a view in front elevation of the upper portion of the air-driven generator.

The air-driven generator 10 can be considered to have a centerline. In the depicted embodiment, the gravitational distribution conduit 12 is longitudinally centered along the centerline. The plural buoyancy conduits 14A through 14D are evenly spaced parallel to the gravitational distribution conduit 12 and along a peripheral circular shape centered around the centerline and around the gravitational distribution conduit 12. As is illustrated in, for example, FIG. 5, where four buoyancy conduits 14A through 14D are employed, they may be disposed in a square cross-sectional shape with the gravitational distribution conduit 12 centered therebetween. Three buoyancy conduits 14 might be disposed in a triangular configuration, five buoyancy conduits 14 in a pentagonal configuration, and so on.

As can be appreciated with combined reference to FIGS. 1-3 and 7-9, the upper chamber 16 in this manifestation is annular and is disposed laterally inward of the elongate portions of the conduits 14A through 14D with a diameter smaller than the length of the legs of the square in which the conduits 14A through 14D are disposed. The buoyancy conduits 14A through 14D have upper end portions that turn inwardly at an approximately right angle to meet the periphery of the upper chamber 16. Here, the buoyancy conduits 14A through 14D have outer edges that intersect the upper chamber 16 generally along sequential tangents to the circular periphery of the upper chamber 16. Accordingly, fluid exhausted from the upper ends of the conduits 14A through 14D will tend to follow an initial rotary pattern within the upper chamber 16 prior to being fed into the upper end of the distributor conduit 12.

A fluid turbine system is interposed between the lower ends of the buoyancy conduits 14A through 14D and the lower end of the distributor conduit 12. The fluid turbine system is operative to convert the kinetic energy embodied in fluid traversing from the lower end of the distributor conduit 12 to the lower ends of the buoyancy conduits 14A through 14D. The fluid turbine system in this embodiment is a rotary turbine system operative to convert the power in the moving fluid to available electrical power, such as electrical power to be output through an electrical connection 42 or stored, such as in a battery bank 44. In the depicted embodiment, a dedicated fluid turbine 18A, 18B, 18C, and 18D is interposed between the lower end of the distributor conduit 12 and the respective lower ends of the buoyancy conduits 14A through 14D. With that, fluid flowing from the lower end of the distributor conduit 12 to the lower end of the first buoyancy conduit 14A will generate electrical energy by actuation of fluid turbine 18A, and working fluid flowing from the lower end of the distributor conduit 12 to the lower ends of the second, third, and fourth buoyancy conduits 14B through 14D will generate electrical energy by actuation of the fluid turbines 18B through 18D respectively.

It is further disclosed that a dedicated heat exchanger 20A through 20D can additionally be fluidically interposed between the lower end of the distributor conduit 12 and the lower ends of the buoyancy conduits 14A through 14D. In the embodiment of the air-driven generator 10 shown, each buoyancy conduit 14A through 14D has a right-angle elbow at the lower end thereof. The elbows are similarly angled toward consecutive conduits 14A through 14D, and the respective heat exchangers 20A through 20D are coupled thereto. A second 90-degree elbow is inwardly angled to connect to an inner pipe section inboard of the heat exchanger 20A through 20D of the adjacent conduit 14A through 14D, and the respective fluid turbines 18A through 18D are coupled at right angles to the inner pipe section to be radially disposed to the centerline and the distributor conduit 12. One or more valves 32 can be interposed along the fluidic path between the bottoms of the buoyancy conduits 14A through 14D and the bottom of the distributor conduit 12.

Air injection systems are provided for injecting air into the columns of working fluid 100 retained within the buoyancy conduits 14A through 14D. In this example, air injectors 24A through 24D are disposed in lower portions of the respective buoyancy conduits 14A through 14D for imparting air into columns of fluid disposed within the conduits 14A through 14D. Each air injector 24A through 24D has plural air lines 28A through 28D associated therewith for receiving air from an air source 22, such as a compressor 22. The compressor 22, the air injectors 24A through 24D, and the plural air lines 28A through 28D can be operative as intermittent air injectors, such as by automated operation of the compressor 22. Air injected into the column of liquid occupies volume within the liquid thereby displacing a large volume of the liquid. Air having risen through the conduits 14A through 14D can be released from the air-driven generator 10, such as through one or more air vents 34 in the upper chamber 16, or the air could itself be recovered and recycled or otherwise directed.

As in FIG. 2, with the buoyancy of air within the liquid 100 and the lighter weight of air compared to that of the liquid 100, the total weight of the material within the conduits 14A through 14D is reduced and the air tends to rise quickly within the liquid 100. Moreover, the density, the weight per unit volume, of the combined air and liquid within the conduits 14A through 14D is caused to be less than the density of the liquid within the gravitational distribution conduit 12. The upward movement of the air within the liquid 100 and the differences in the densities of the fluids within the fluidically connected buoyancy conduits 14A through 14D compared to the density of the fluid within the gravitational distribution conduit 12 produces a significant upward motive flow of the fluids within the buoyancy conduits 14A through 14D in comparison to the fluid within the gravitational distribution conduit 12, which tends to fall under the force of gravity. A cyclic, closed-loop movement of the liquid 100 within the air-driven generator 10 is thus induced, the kinetic energy of that liquid movement being actively harvested by the fluid turbines 18A through 18D to create electric power for output or storage.

The upper chamber 16 is designed to remove entrained air from the liquid 100 that has risen from the respective buoyancy conduits 14A through 14D with the goal of ensuring that the fluid fed to the gravitational distribution conduit 12 is at least substantially devoid of air bubbles. With the air separation aspect of the upper chamber 16, the fluid in the gravitational distribution conduit 12 is as dense as possible thereby promoting continuous, efficient operation of the air-driven generator 10. The air separation facilitated by the upper chamber 16 thus induces the liquid within the gravitational distribution conduit 12 to achieve maximum density and optimal downward force thereby promoting head pressure and fluid flow to drive the fluid turbines 18A through 18D and to create electric power.

The efficiency of the air-driven generator 10 is assisted by the air entrainment removal upper chamber 16. The upper chamber 16 allows the air-driven generator to operate continuously at a high level of efficiency through its removal of even very small air bubbles from the fluid 100 and preventing such air bubbles from being dragged down the gravitational distribution conduit 12 and undesirably lowering the density of the fluid 100 therein. Based on the tangential receipt of the buoyancy conduits 14A through 14n into the upper chamber 16, the vertical movement of the fluid 100 and air received from the buoyancy conduits 14A through 14n is converted into substantially rotary motion subject to centrifugal and centripetal forces.

The rotary motion of the fluid 100 within the upper chamber 16 tends to collect the less dense fluid 100 in the top center of the chamber 16 and the denser fluid 100 to the outside and bottom of the chamber 16. Meanwhile, the downward flow of the gravitational distribution conduit 12 tends to come from the outside bottom of the chamber 16.

Figure 18:
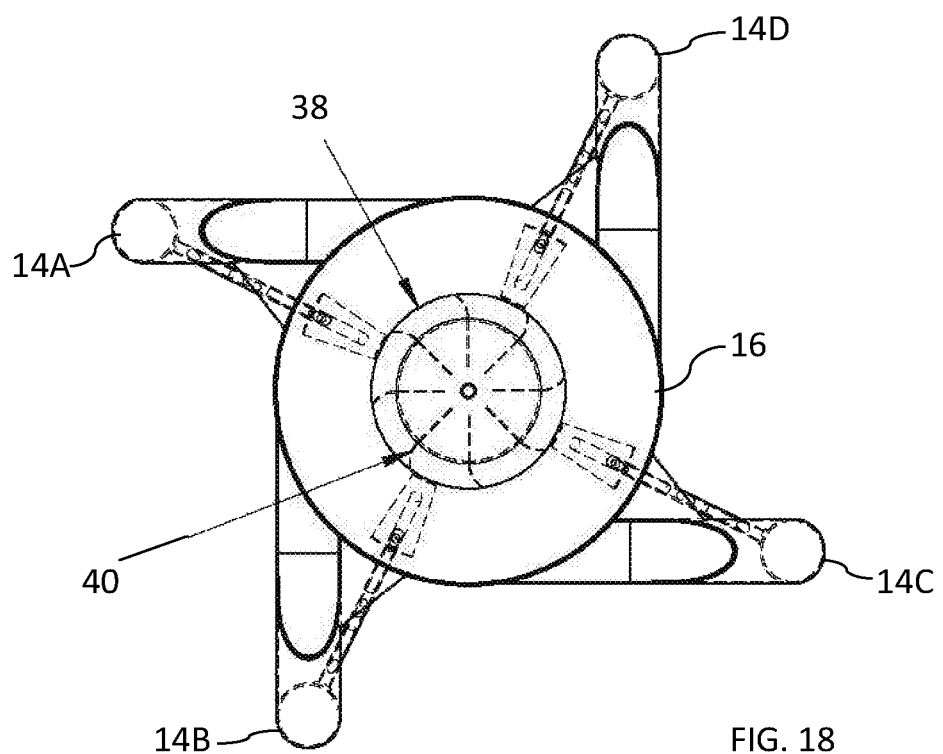
FIG. 18 is a partially sectioned top plan view of the upper portion of the air driven generator of FIG. 10.

Moreover, as FIG. 18 shows, the chamber 16 can direct rotational velocity of the fluid 100 into baffles 38 in the lower central portion of the chamber 16 where the rotational velocity of the fluid 100 is changed into a laminar, downwardly-flowing fluid 100. This process minimizes losses due to the change in direction and friction and turbulence. To prevent a well of depression from the downward flow of the fluid 100, a plate 40 is placed over the baffles 38. The plate 40 prevents suction of air or fluid 100 entrapped with air from entering the gravitational distribution conduit 12.

Figure 10:
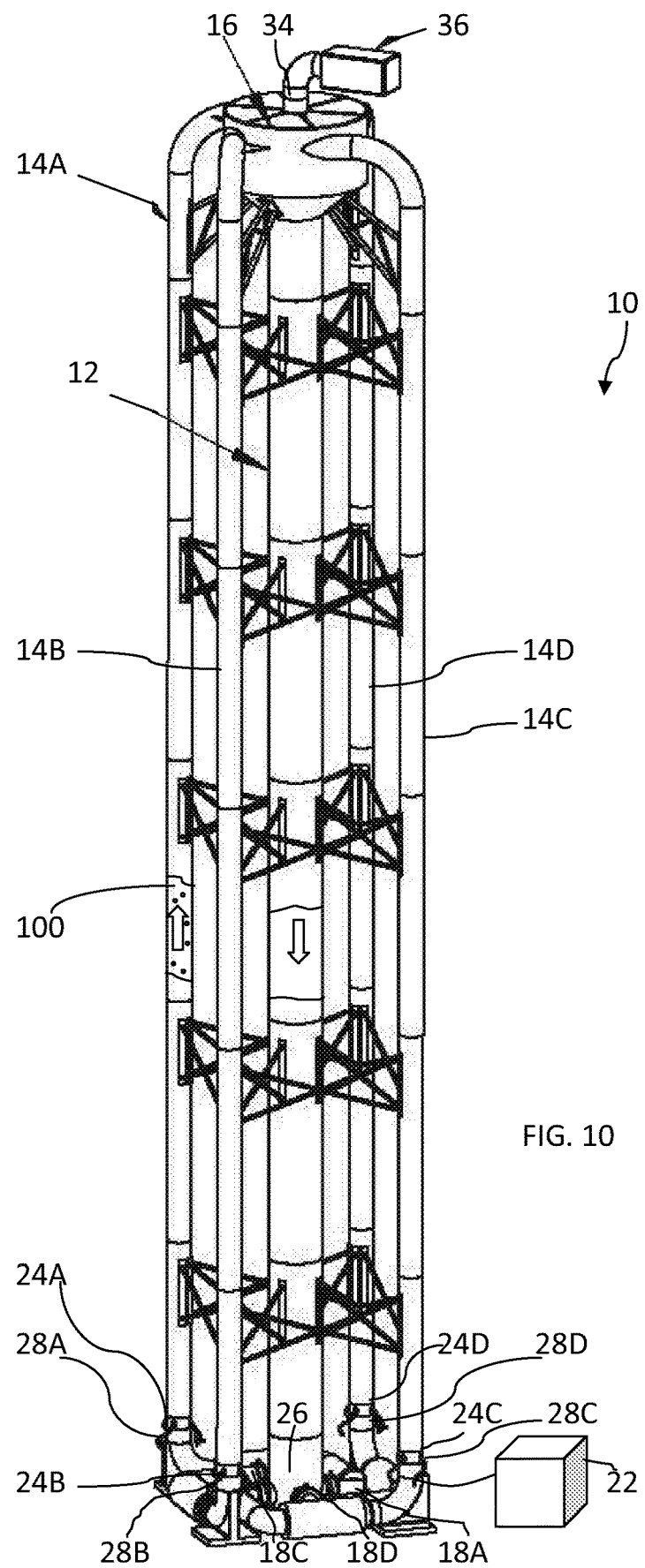
FIG. 10 is a perspective view of an alternative embodiment of the air-driven generator disclosed herein.
Figure 11:
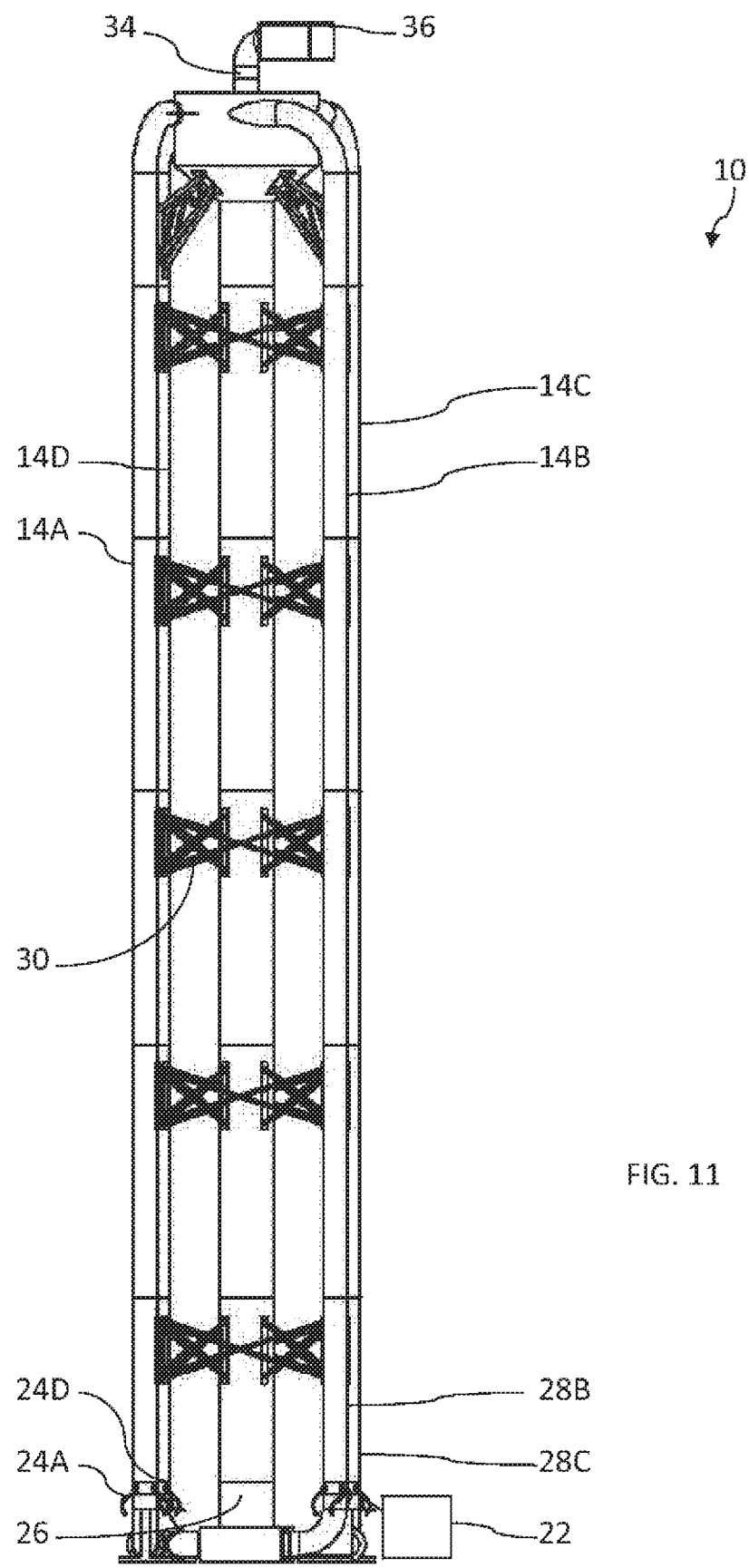
FIG. 11 is a view in front elevation of the air-driven generator of FIG. 10.
Figure 12:
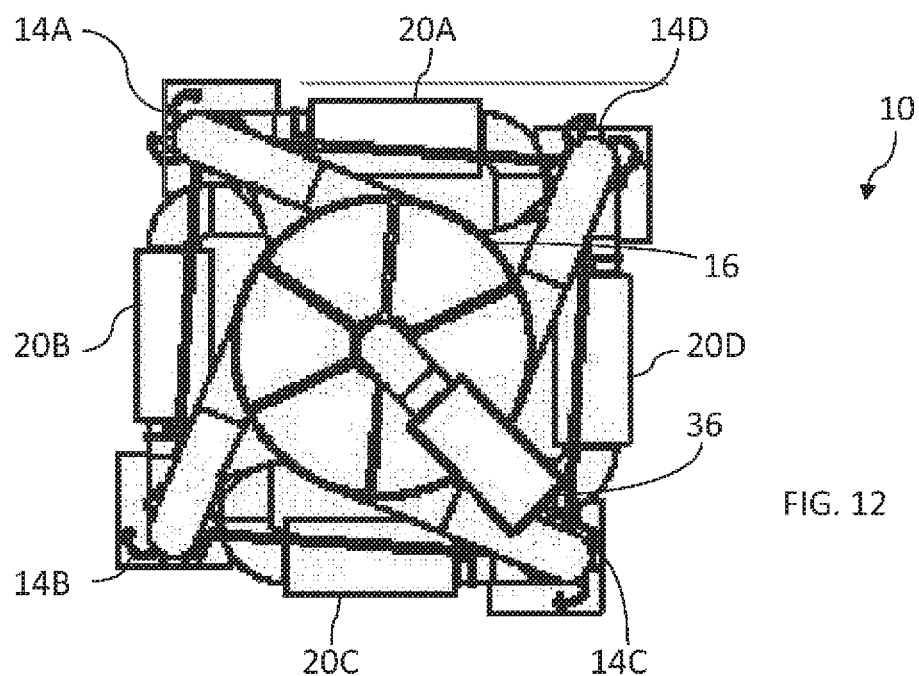
FIG. 12 is a top plan view of the air-driven generator of FIG. 10.
Figure 13:
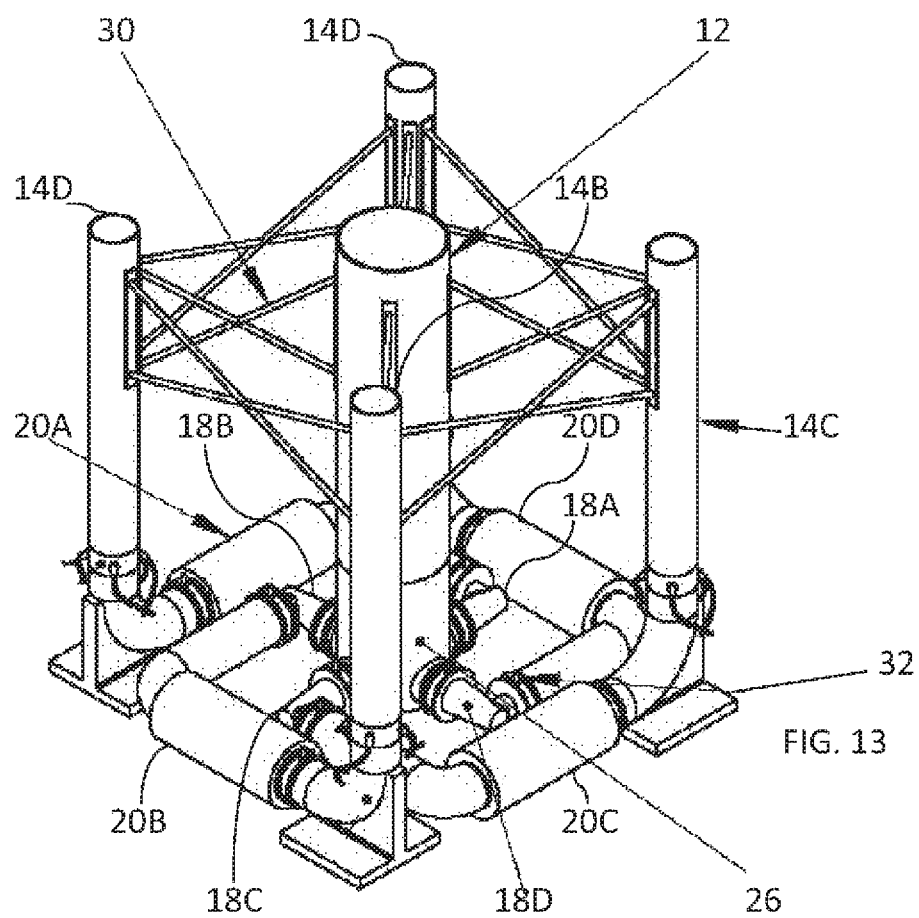
FIG. 13 is a perspective view of a base portion of the air-driven generator of FIG. 10.
Figure 14:
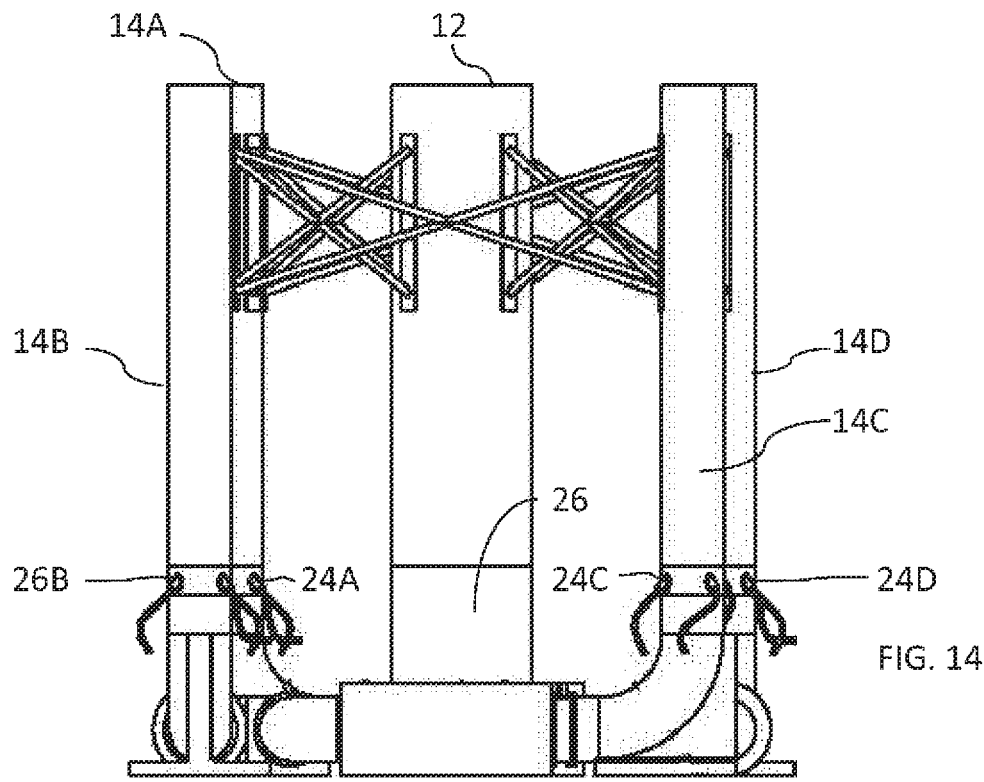
FIG. 14 a view in front elevation of the base portion of the air-driven generator of FIG. 10.
Figure 15:
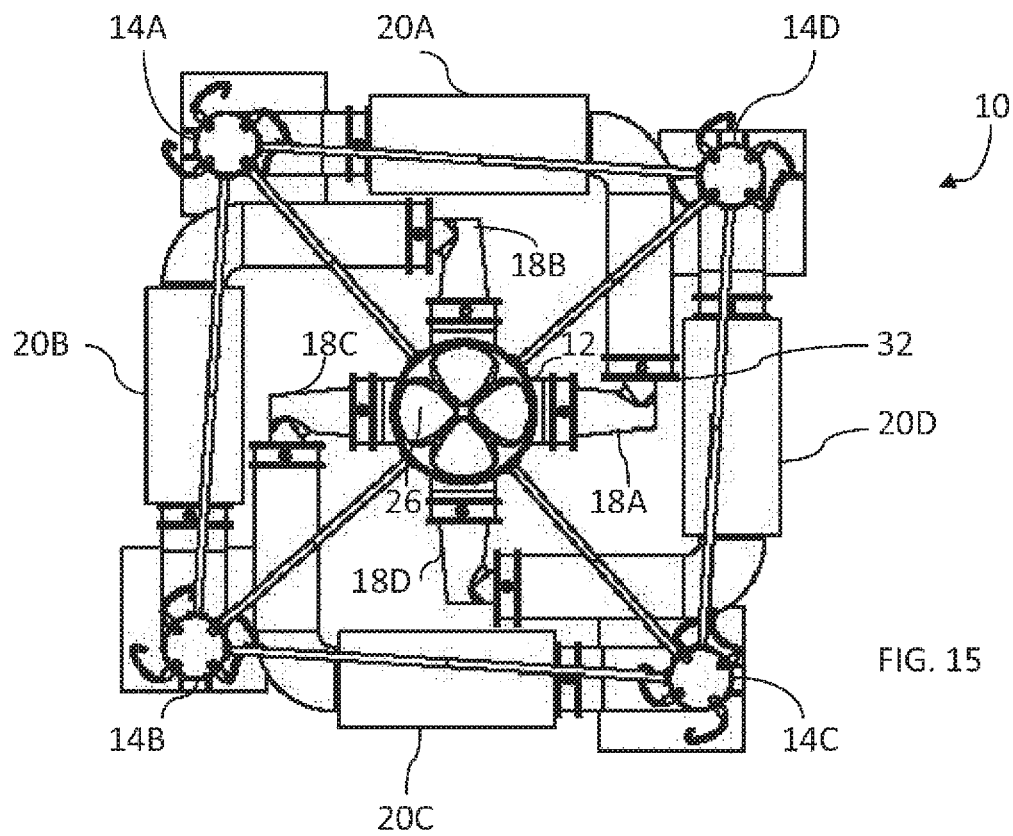
FIG. 15 a partially-sectioned top plan view of the air driven generator of FIG. 10.
Figure 16:
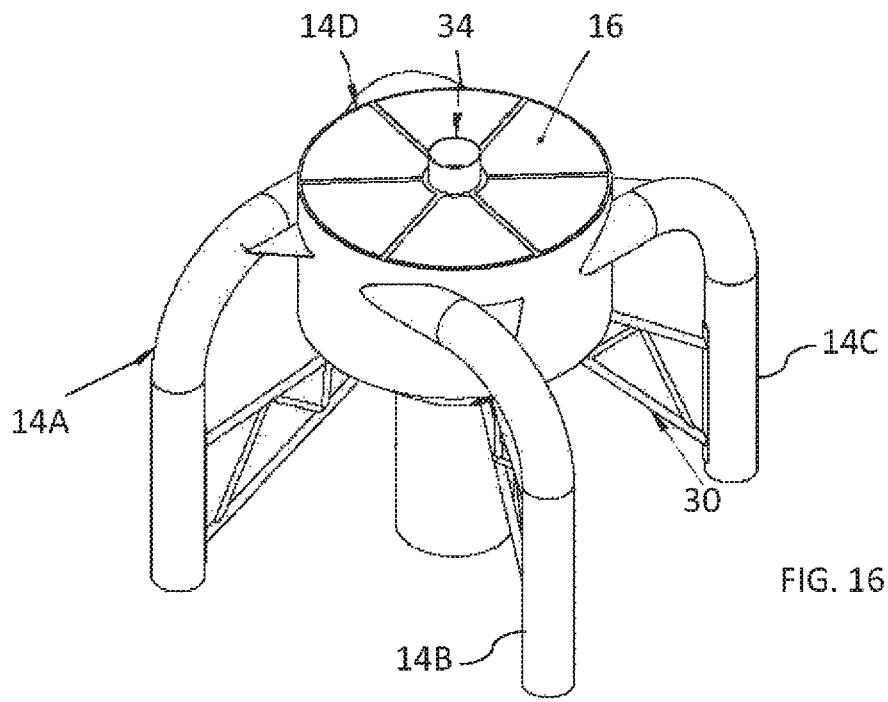
FIG. 16 is a perspective view of an upper portion of the air-driven generator of FIG. 10 with the Rankin cycle generator removed.
Figure 17:
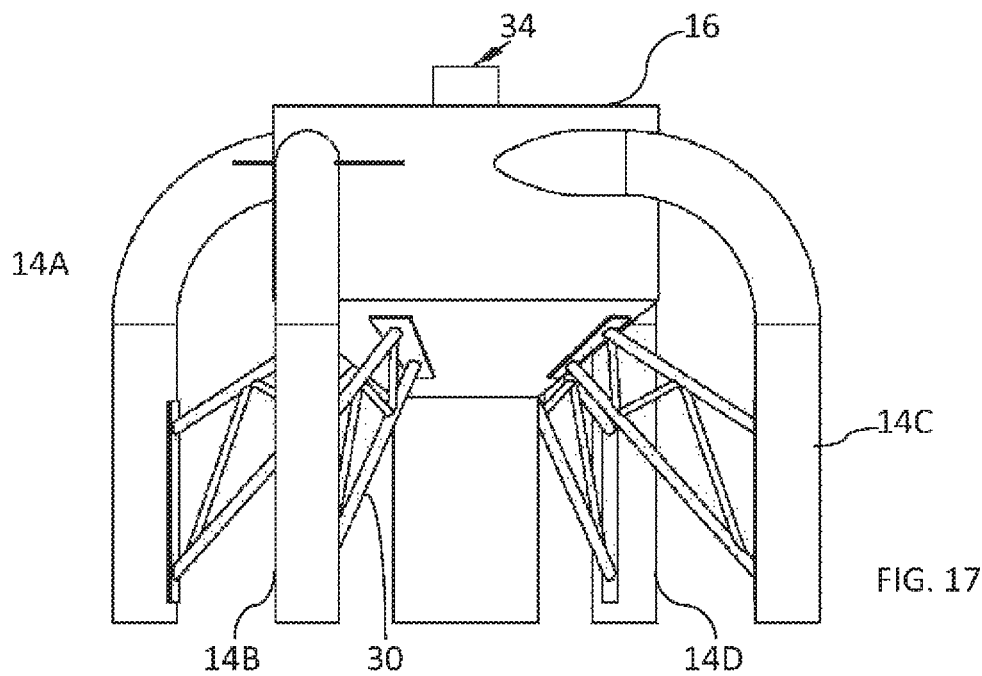
FIG. 17 a view in front elevation of the upper portion of the air-driven generator of FIG. 10, again with the Rankin cycle generator removed.

Additional benefits of using heat pumps to raise the fluid temperature include that exhaust air is now much hotter than ambient air. With this, the air-driven generator 10 can use an Organic Rankin Cycle generator (ORC) 36 to recover heat energy that would normally be exhausted to surrounding air. Such an embodiment is depicted, for instance, in FIGS. 10 and 11 where the Organic Rankin Cycle Generator 36 is disposed to receive air exhausted from the air vent 34 of the upper chamber 16. The Organic Rankin Cycle Generator 36 is predicted to recover 10% to 15% of the energy that would normally be lost to the environment thereby further increasing the overall performance of the generator 10. The chamber 16 thus collects the exhausted heated air through the vent 34 to direct it into the Organic Rankin Cycle Generator 36 to extract additional energy from the low-grade waste heat.

The overall size and relative proportions of the air-driven generator 10 and the components thereof can vary within the scope of the invention. The height of the superstructure formed by the gravitational distribution conduit 12, the buoyancy conduits 14A through 14D, and the upper chamber 16 should be sufficient to permit the air displacing liquid 100 within the buoyancy conduits 14A through 14D to create a net differential density and liquid movement to develop head pressure in the gravitational distribution conduit 12 with the head pressure calculated to be proportional to the difference in the density of the liquid in the buoyancy conduits 14A through 14D compared to the density of the liquid in the gravitational distribution conduit 12. In one non-limiting practice of the invention, for instance, the air-driven generator 10 has an overall height of in excess of eighty feet, but embodiments of hundreds or even thousands of feet in height are contemplated. The air-driven generator 10 could be manufactured in sections and coupled on-site.

The closed-loop generator 10 advantageously is operative without requiring a continuous water source or a large area of dedicated land. The closed-loop generator 10 can be scaled to substantially any size, including megawatt commercial power plants. In this closed-loop system, the fluid displaced from the air-injected buoyancy conduits 14A through 14D rises to an upper chamber 16 sufficiently large to retain fluid so received and to feed the same to the downward-flowing distributor conduit 12 to drive the respective fluid turbines 18A through 18D. It is contemplated that taller columns of fluid will induce greater efficiencies of operation since residence time of air rising within the buoyancy conduits 14A through 14D is increased thereby increasing displacement and producing higher head pressure and flow for the same amount of air delivered per unit time. Moreover, the air-driven generator 10 can be located almost anywhere on Earth to reduce fossil fuel consumption and to provide a source of electrical energy even in areas of limited access to electrical power grids.

The plural buoyancy conduits 14A through 14D and their configuration relative to one another and relative to the centrally disposed gravitational distribution conduit 12 provide advantages in efficiency and operation in comparison to that which might be achieved using a liquid column for receiving injected air. Because the displacement of fluid and the development of head pressure have been found to be limited to approximately 55% of any column of liquid, there is a limit on the amount of energy that can be developed in a single buoyancy column of fluid. Moreover, head pressure and fluid flow can be limited by pipe diameter. Because of these constraints, there are limits to the amount of power and energy production that could be achieved in a single buoyancy conduit configuration. Conversely, the presently disclosed air-driven generator 10 permits the combination of plural buoyancy conduits 14A through 14n and for the feeding of fluid flowing therefrom into a single downwardly-flowing distributor conduit 12. Each buoyancy conduit 14A through 14n is able to achieve maximum head pressure and, by combining such conduits 14A through 14n, the head pressure can remain the same while the flow is doubled, tripled, and so on for as many units as are employed. The plural buoyancy conduits 14 cooperate with a single distributor conduit 12 that has equal or greater cross-sectional volume to drive the fluid turbine system.

With larger power production, the economics of the air-driven generator 10 can be improved with larger turbines 18A through 18D and associated electrical generating equipment that is of reduced cost per kilowatt of electrical production while exhibiting greater efficiencies. With the redundant nature of independently operating buoyancy conduits 14A through 14n, the effects of individual malfunctions can be minimized and portions of the air-driven generator 10 can be isolated, repaired, and maintained without shutting down the entire generator 10. Indeed, redundant turbines 18A through 18n and overall units can be added, removed, repaired, and maintained independently, such as to be brought on line in the event of equipment failures or routine maintenance operations while permitting ongoing plant operation.

The working fluid 100 within the air-driven generator can be chosen for improved performance. In this regard, it is appreciated that, if head pressures of certain levels are to be achieved, the tower air-driven generator 10 may need to be several hundred to thousands of feet tall for megawatt-sized systems. Such structures would drastically increase the cost and complexity of manufacture and would impose limitations of locations and difficulties in achieving regulatory approval. To reduce the required height of the air-driven generator 10, a very dense liquid, such as a water-based, high-density material with a density three to four times greater than that of water, which would then allow the air-driven generator 10 to be constructed with a proportionately reduced height while achieving similar power production. Very dense liquid as contemplated for use in the air-driven generator 10 also may exhibit greater viscosity thereby slowing the passage of air through the liquid 100 and increasing residence time, fluid flow, and power production. The very dense liquid allows for higher head pressures in larger pipes. The very dense liquid 100 additionally operates as a lubricant to lower frictional resistance to movement of the liquid 100 and increasing overall efficiency. The liquid 100 has a very low abrasive content and is non-corrosive thereby lowering wear on pipes and equipment. Still further, the boiling point and vapor pressure of the high-density fluid 100 can be higher to help control vapor losses.

Varied working fluids 100 may be employed within the scope of the invention except as air-driven generator 10 may be expressly limited by the claims. By way of an illustrative example, one embodiment of the working fluid 100 can have the following parts by weight: water at 2.5 to 4; Bentonite Clay in a colloidal suspension at 1 to 3; Barium Sulfate as a weighting material at 1 to 5; elemental Iron as a weighting material with 50 to 200 mesh size at 0.5 to 4.5; salts as, among other things, gel control at 0.25 to 1.5; and Calcium Hydroxide as a pH control at 0.20 to 1.

A working fluid 100 so composed is super dense with a weight of 190 to 240 pounds per cubic foot depending on the formula used. The working fluid 100 is calculated to be significantly denser than Barium Sulfate alone with a much lower final viscosity. Further, the working fluid 100 is less abrasive than Barium Sulfate taken alone and is noncorrosive to carbon steel, brass, copper, bronze, and combination of such materials.

It is expressly noted that other salts would work and be within the scope of the invention to act as similar corrosion inhibitors and to interfere with the gel formation that can be used. Furthermore, the mesh size of elemental iron may be selected to achieve different lubrication properties and abrasion resistance. Still further, depending on the materials used in the air-driven generator 10, the salts can be adjusted or changed to make the working fluid 100 compatible with the materials or combination of materials. Salts currently contemplated include, but are not limited to, calcium chloride and magnesium sulfate. The working fluid 100 will preferably resist freezing while exhibiting an increased boiling point to, among other things, control evaporation. The components of the working fluid 100 will preferably stay suspended for extended periods.

In view of the air-driven nature of the generator 10 and the requirement for energy to produce the compressed air based on which the system operates, it is further contemplated that an air compression system can be included within or coupled to the air source 22. Under the air compression system, alternating mechanical compressors and heat pumps remove adiabatic heat and lower backpressure. In turn, the energy required to compress air is reduced. Such a system is disclosed in the present inventor's Application No. 62/618,720, filed Jan. 18, 2018, which is incorporated herein by reference. The air compression system is calculated to lower the required energy of the mechanical compressors by approximately 60%. Some of this savings of energy is used up by the heat pump compressors, but because heat pumps are used to remove heat at high coefficients of performance (COP) of an average of 8 or better, the total amount of energy required is still calculated to be lower than a traditional compressor. In addition, heat pumps have an advantage in that they move the heat from one place to another very efficiently. With that, heat can be returned to the fluid 100 within the air-driven generator 10 by operation of heat exchangers 20A through 20D disposed to receive fluid 100 after passing through the respective fluid turbines 18A through 18D, which can facilitate replacement of the lost adiabatic heat to keep the performance of the air-driven generator 10 operating in a steady state. The heat pumps can also collect heat due to friction and the condensation of water vapor contained in the air that is compressed. It is calculated that not only can adiabatic heat be returned but such a combination can return approximately 25% more energy to the generator 10. This additional energy has been calculated to raise the temperature of the liquid 100 about 0.6 degrees F. on average per minute of operation. This will gradually increase the temperature of the overall system until it reaches an equilibrium where energy in equals energy out. Depending on the ambient conditions, that equilibrium is about 170 to 200 degrees F. The resulting increase in temperature of the fluid 100 causes the air in the fluid 100 to over expand about 35% and increases the displacement of the fluid 100 within the generator 10. This increase in displacement of the fluid 100 directly increases the power output. Accordingly, energy used in the heat pump portion of the compression system is used to increase the overall power of the generator 10.

In this regard, it will be understood that, in a normal single-stage compressor, the air is compressed to the desired psi in one step. All of the release of energy in the form of heat stays with the compressed air, but the pressure and volume has changed. This means the increased temperature applies a back pressure to the compressor, which uses more energy in the compressor. In a two-stage compressor, the air is air cooled between the first stage and second stage to remove some of the adiabatic heat. The removal of the adiabatic heat lowers the back pressure on the compressor in the second stage and, therefore, lowers the energy to compress the air. It does not lower the amount of adiabatic heat needed to be removed. It lowers the electrical energy of the compressor only because some of the back pressure of the released heat is removed by the air-cooled intercooler, which uses no energy. With that, less energy has to be applied to the compressor. Further advantage can be had with a three-stage compressor. In such processes, the heat that is removed is typically dissipated into the surrounding air.

Under the present invention, an air compression cycle can be employed, such as by the air source 22, using heat pumps to remove heat from the compressed air in intercoolers. By using heat pumps to cool the intercooler, the incoming compressed air from the previous cycle can be used to lower than the ambient air temperature. This is calculated to lower the energy needed for air compression by the mechanical air compressors by 50% to 60%. By increasing the number of compression cycles, the Coefficients of Performance (COP) of the heat pumps can be kept high above 8. With this, for each 8 units of heat that is sent to the condenser, the heat pump compressor only uses 1 unit of electricity, which is also in the form of heat. This enables the capture not only of the adiabatic heat but also mechanical heat losses due to the friction of the air compressors. The harvested heat can then be redirected. Within the scope of the invention, the temperature can be elevated to a higher grade usable temperature range with a cascading heat pump system where each cycle raises the temperature. In each cycle, more energy is used, but energy is also captured by the heat pumps to be used later in the process thereby reducing or eliminating energy losses.

Heat pumps also solve another problem with compressed air, namely water vapor. Most air contains some water vapor. The compression process forces the water to condense. This releases the heat of condensation, which applies back pressure on the air compressor and increases the energy required by the compressor. In the summer, the relative humidity can be very high which can significantly increase the amount of energy needed to compress the air. By using properly-sized heat pumps in the intercoolers, that extra released energy is captured, and electricity needed for the air compressors is kept low. That large amount of captured energy can now be used later in the process to increase the power output of the generator 10.

The air-driven generator 10 thus converts compressed air to moving, high-density, low drag fluid 100 to drive a fluid turbine system in a closed loop system. High pressure air is injected into the fluid 100 to displace fluid 100 and create an upward buoyancy force within the buoyancy conduits 14A through 14D. As the columns of fluid 100 move upwardly, pressure reduces and the volume of displaced fluid 100 increases proportionately. The sum of all of the displacement of fluid 100 by air in buoyancy conduits 14A through 14D forms a total buoyancy force. The kinetic energy of a moving object is calculated based on mass times velocity. The energy available in the moving fluid 100 falling within the gravitational distribution conduit 12 available to be converted to electricity by the fluid turbines 18A through 18D can be calculated based on the density of the moving fluid 100 multiplied by the liquid flow in volume times the height or head over which the liquid 100 falls multiplied by the acceleration of gravity. The energy actually harvested is the product of the foregoing calculation multiplied by the efficiency of the energy conversion.

To increase the total displacement of the fluid 100 by the air provided by the air source 22 and injected through the air injectors 24A through 24D and in turn increase the power output of the turbine generators 18A through 18D, collected heat from the adiabatic process can be deposited with the condensation of the water vapor and mechanical heat losses back into the fluid 100 after flow through the turbine generators 18A through 18D but prior to the site of the air injectors 24A through 24D.

The injection of heat replaces heat lost through the adiabatic process so the air-driven generator 10 remains in a stable state, but the extra heat begins to raise the temperature of the fluid 100 from 0.6 to 1.5 degrees Fahrenheit for each minute of operation, depending on outside atmospheric conditions. As the heat of the system increases, the fluid displacement increases and the energy output increases. In this situation, the rate of heat energy loss due to increase in exiting air temperature and water vapor will also tend to increase. The total system will eventually reach an equilibrium of energy in versus energy out. The increase in energy production is calculated to equal the equivalent of all of the additional energy collected beyond the adiabatic heat minus the turbine efficiency.

In operation of the air-driven generator 10, the temperature of the exiting air will be significantly higher than the surrounding ambient air temperature. An Organic Rankin Cycle generator 36 can be exploited to convert low grade heat into electricity before the hot air is dissipated into the surrounding atmosphere. By the increase of the exiting air temp by 100 degrees F. or more, 10% to 15% in additional energy can be recaptured in electrical production using the Organic Rankin Cycle generator 36.

A number of calculations can be provided to relay predicted performance of the air-driven generator 10 with it being understood that no representations as to actual performance are intended to be relied upon. It is calculated that, if the air-driven generator used a standard compressor, it would make approximately 90 KWs for each 100 KWs put into the closed looped generating system. However, it took 115 KWs with dry air much greater with humid air to make the 100 KWs of air because of the mechanical drag of the compressor. That yields a loss of 25 KWs, which makes it a good battery for storage but not for generating power. Nevertheless, use of the present inventor's air compression system is calculated to require only 40 KWs to make the 100 KWs of air resulting in a net gain of 50 KWs of power. In addition, extra heat from mechanical drag and water vapor can be collected and used in the closed-loop system to raise the temperature of the fluid 100 and generate, as calculated, 35% more power or 32 KWs. A total of 50 KWs plus 32 KWs or 82 KWs of net gain is predicted. In addition, hot exiting air contains energy. Using the Organic Rankin Cycle generator (ORC) 36, an additional 15% or 12 KWs of power is capable of being captured to produce a total net gain of 94 KWs. Using a standard 20% efficiency loss, a net gain of 75 KWs of power is predicted. It is believed that a full-sized pilot system must be constructed to understand how much of this calculated energy can actually be recovered, and nothing in this disclosure should be interpreted or relied upon as an affirmative representation of performance.

With certain details and embodiments of the present invention for an air-driven generator 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

The invention claimed is:

1. An air-driven generator for generation electric power from movement of a working fluid, the air-driven generator comprising:
   an elongate gravitational distribution conduit with an upper end and a lower end;
   plural elongate buoyancy conduits, each buoyancy conduit with an upper end and a lower end;
   wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;
   a fluid turbine system fluidically interposed between the lower end of the gravitational distribution conduit and the lower ends of the buoyancy conduits;
   a heat exchanger interposed between the lower end of the gravitational distribution conduit and the lower end of each buoyancy conduit; and
   an air injection system operative to inject air into each of the buoyancy conduits;
   wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

2. The air-driven generator of claim 1 wherein the air injection system comprises one or more air injectors coupled to each buoyancy conduit in the combination with a source of compressed air coupled to the one or more air injectors coupled to each buoyancy conduit.

3. The air-driven generator of claim 1 further comprising an upper chamber wherein the upper ends of the buoyancy conduits are in fluidic communication with the upper end of the gravitational distribution conduit through the upper chamber.

4. The air-driven generator of claim 3 wherein the upper chamber has a substantially annular sidewall.

5. The air-driven generator of claim 4 wherein the upper end of each buoyancy conduit meets the upper chamber in a non-radial direction.

6. The air-driven generator of claim 5 wherein the upper ends of the buoyancy conduits meet the upper chamber in an at least partially tangential direction with respect to a central longitudinal axis of the upper chamber.

7. The air-driven generator 5 wherein the upper ends of the buoyancy conduits meet the upper chamber in approximately equal non-radial angles with respect to a central longitudinal axis of the upper chamber such that working fluid exhausted from the upper ends of the buoyancy conduits will tend to follow an initial rotary pattern within the upper chamber.

8. The air-driven generator of claim 7 further comprising a baffle structure within the upper chamber configured to reduce rotational motion of the working fluid entering the elongate gravitational distribution conduit.

9. The air-driven generator of claim 1 wherein the gravitational distribution conduit has a longitudinal centerline and wherein the buoyancy conduits are centered about the longitudinal centerline.

10. The air-driven generator of claim 9 wherein the buoyancy conduits and the gravitational distribution conduit have substantially parallel dispositions.

11. The air-driven generator of claim 10 wherein there are four buoyancy conduits.

12. The air-driven generator of claim 11 wherein the four buoyancy conduits are disposed in a square configuration.

13. The air-driven generator of claim 1 wherein the lower end of the gravitational distribution conduit is in fluidic communication with the lower ends of the plural buoyancy conduits through a fluid distributor disposed at the bottom end of the gravitational distribution conduit in combination with fluidic return connections.

14. The air-driven generator of claim 1 wherein the fluid turbine system comprises a fluid turbine fluidically interposed between the lower end of the gravitational distribution conduit and the lower end of each buoyancy conduit.

15. The air-driven generator of claim 1 further comprising a working fluid disposed within the closed fluid loop formed between the buoyancy conduits and the gravitational distribution conduit.

16. The air-driven generator of claim 15 wherein the working fluid has a specific gravity relative to water of greater than one.

17. The air-driven generator of claim 16 wherein the working fluid has a specific gravity relative to water of at least two.

18. The air-driven system of claim 1 wherein the air injection system comprises one or more air injectors coupled to each buoyancy conduit in combination with a source of compressed air coupled to the one or more injectors coupled to each buoyancy conduit, wherein the source of compressed air comprises a system of an alternating series of mechanical compressors and heat pumps.

19. The air-driven system of claim 1 further comprising a framework wherein the buoyancy conduits and the gravitational distribution conduit are retained by the framework to form a superstructure.

20. The air-driven generator of claim 1 further comprising an upper chamber wherein the upper ends of the buoyancy conduits are in fluidic communication with the upper end of the gravitational distribution conduit through the upper chamber and wherein the upper chamber has an air vent for permitting a release of air injected from the air injection system and exhausted from the upper ends of the buoyancy conduits.

21. The air-driven system of claim 20 further comprising an Organic Rankin Cycle Generator disposed to receive air exhausted from the air vent of the upper chamber.

22. An air-driven generator for generation electric power from movement of a working fluid, the air-driven generator comprising:
an elongate gravitational distribution conduit with an upper end and a lower end;
plural elongate buoyancy conduits, each buoyancy conduit with an upper end and a lower end;
wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;
a fluid turbine system fluidically interposed between the lower end of the gravitational distribution conduit and the lower ends of the buoyancy conduits;
an upper chamber, wherein the upper ends of the buoyancy conduits are in fluidic communication with the upper end of the gravitational distribution conduit through the upper chamber, and wherein the upper chamber has an air vent for permitting a release of air injected from the air injection system and exhausted from the upper ends of the buoyancy conduits;
an Organic Rankin Cycle Generator disposed to receive air exhausted from the air vent of the upper chamber; and
an air injection system operative to inject air into each of the buoyancy conduits; wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

23. The air-driven system of claim 22 wherein the upper ends of the buoyancy conduits meet the upper chamber in approximately equal non-radial angles with respect to a central longitudinal axis of the upper chamber such that working fluid exhausted from the upper ends of the buoyancy conduits will tend to follow an initial rotary pattern within the upper chamber.

24. The air-driven system of claim 23 further comprising a baffle structure within the upper chamber configured to reduce rotational motion of the working fluid entering the elongate gravitational distribution conduit.

25. An air-driven generator for generation electric power from movement of a working fluid, the air-driven generator comprising:
an elongate gravitational distribution conduit with an upper end and a lower end;
plural elongate buoyancy conduits, each buoyancy conduit with an upper end and a lower end;
wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;
a fluid turbine system fluidically interposed between the lower end of the gravitational distribution conduit and the lower ends of the buoyancy conduits;
an upper chamber wherein the upper ends of the buoyancy conduits are in fluidic communication with the upper end of the gravitational distribution conduit through the upper chamber wherein the upper chamber has a substantially annular sidewall, wherein the upper ends of the buoyancy conduits meet the upper chamber in an at least partially tangential direction with respect to a central longitudinal axis of the upper chamber; and
an air injection system operative to inject air into each of the buoyancy conduits; wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

26. The air-driven system of claim 25 further comprising:
a baffle structure within the upper chamber configured to reduce rotational motion of the working fluid entering the elongate gravitational distribution conduit; and
a plate disposed above the baffle structure configured to prevent suction of air or working fluid entrapped with air from entering the elongate gravitational distribution conduit.

27. The air-driven system of claim 25 further comprising:
an air vent in the upper chamber for permitting a release of air injected from the air injection system and exhausted from the upper ends of the buoyancy conduits; and
an Organic Rankin Cycle Generator disposed to receive air exhausted from the air vent of the upper chamber.

28. An air-driven generator for generation electric power from movement of a working fluid, the air-driven generator comprising:
an elongate gravitational distribution conduit with an upper end and a lower end;
plural elongate buoyancy conduits, each buoyancy conduit with an upper end and a lower end;
wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;
a fluid turbine system fluidically interposed between the lower end of the gravitational distribution conduit and the lower ends of the buoyancy conduits;
an upper chamber wherein the upper ends of the buoyancy conduits are in fluidic communication with the upper end of the gravitational distribution conduit through the upper chamber and the upper chamber has a substantially annular sidewall, wherein the upper ends of the buoyancy conduits meet the upper chamber in approximately equal non-radial angles with respect to a central longitudinal axis of the upper chamber in a plane perpendicular to the central longitudinal axis such that working fluid exhausted from the upper ends of the buoyancy conduits will tend to follow an initial rotary pattern within the upper chamber; and
an air injection system operative to inject air into each of the buoyancy conduits;
wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

29. The air-driven system of claim 28 further comprising:
a baffle structure within the upper chamber configured to reduce rotational motion of the working fluid entering the elongate gravitational distribution conduit; and
a plate disposed above the baffle structure configured to prevent suction of air or working fluid entrapped with air from entering the elongate gravitational distribution conduit.

30. The air-driven system of claim 28 further comprising a heat exchanger interposed between the lower end of the gravitational distribution conduit and the lower end of each buoyancy conduit.

31. An air-driven generator for generation electric power from movement of a working fluid, the air-driven generator comprising:
an elongate gravitational distribution conduit with an upper end and a lower end;
plural elongate buoyancy conduits, each buoyancy conduit with an upper end and a lower end;
wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;
a fluid turbine system fluidically interposed between the lower end of the gravitational distribution conduit and the lower ends of the buoyancy conduits;
an upper chamber wherein the upper ends of the buoyancy conduits are in fluidic communication with the upper end of the gravitational distribution conduit through the upper chamber and the upper chamber has a substantially annular sidewall, and wherein the upper chamber comprises a baffle structure within the upper chamber configured to reduce rotational motion of the working fluid entering the elongate gravitational distribution conduit; and
an air injection system operative to inject air into each of the buoyancy conduits;
wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

32. The air-driven system of claim 31 further comprising a plate disposed above the baffle structure configured to prevent suction of air or working fluid entrapped with air from entering the elongate gravitational distribution conduit.

33. The air-driven system of claim 32 wherein the upper ends of the buoyancy conduits meet the upper chamber in an at least partially tangential direction with respect to a central longitudinal axis of the upper chamber such that working fluid exhausted from the upper ends of the buoyancy conduits will tend to follow an initial rotary pattern within the upper chamber.

34. An air-driven generator for generation electric power from movement of a working fluid, the air-driven generator comprising:

an elongate gravitational distribution conduit with an upper end and a lower end;

plural elongate buoyancy conduits, each buoyancy conduit with an upper end and a lower end;

wherein the upper ends of the buoyancy conduits are in fluidic communication with the upper end of the gravitational distribution conduit and wherein the lower end of the gravitational distribution conduit is in fluidic communication with the lower ends of the plural buoyancy conduits such that a closed fluid loop is formed between the buoyancy conduits and the gravitational distribution conduit with working fluid flowing from the upper ends of the buoyancy conduits fed into the upper end of the gravitational distribution conduit and working fluid flowing downwardly through the gravitational distribution conduit being fed from the lower end of the distributor conduit into the lower ends of the plural buoyancy conduits;

a fluid turbine system fluidically interposed between the lower end of the gravitational distribution conduit and the lower ends of the buoyancy conduits;

an air injection system operative to inject air into each of the buoyancy conduits, the air injection system comprising one or more air injectors coupled to each buoyancy conduit in combination with a source of compressed air coupled to the one or more injectors coupled to each buoyancy conduit, wherein the source of compressed air comprises a system of an alternating series of mechanical compressors and heat pumps;

wherein an injection of air into the working fluid disposed in the buoyancy conduits will tend to induce upward flow of the working fluid in the buoyancy conduits such that working fluid fed to the upper end of the gravitational distribution conduit will have a downward flow within the gravitational distribution conduit to actuate the fluid turbine system.

35. The air-driven system of claim 34 further comprising an upper chamber, wherein the upper ends of the buoyancy conduits are in fluidic communication with the upper end of the gravitational distribution conduit through the upper chamber and the upper chamber has a substantially annular sidewall, and wherein the upper end of each buoyancy conduit meets the upper chamber in a non-radial direction with respect to a central longitudinal axis of the upper chamber.

36. The air-driven system of claim 35 further comprising a baffle structure within the upper chamber configured to reduce rotational motion of the working fluid entering the elongate gravitational distribution conduit.

* * * * *

UNITED STATES PATENT AND TRADEMARK OFFICE
CERTIFICATE OF CORRECTION

PATENT NO. : 10,683,839 B2  
APPLICATION NO. : 16/115531  
DATED : June 16, 2020  
INVENTOR(S) : Mark J. Maynard Page 1 of 1

It is certified that error appears in the above-identified patent and that said Letters Patent is hereby corrected as shown below:

In the Claims

At Column 14, Claim number 7, Line number 1, please insert -- of claim -- between "generator" and "5"

At Column 15, Claim number 18, Line number 1, please replace "system" with -- generator --

At Column 15, Claim number 19, Line number 1, please replace "system" with -- generator --

At Column 15, Claim number 21, Line number 1, please replace "system" with -- generator --

At Column 16, Claim number 23, Line number 1, please replace "system" with -- generator --

At Column 16, Claim number 24, Line number 1, please replace "system" with -- generator --

At Column 17, Claim number 26, Line number 1, please replace "system" with -- generator --

At Column 17, Claim number 27, Line number 1, please replace "system" with -- generator --

At Column 18, Claim number 29, Line number 1, please replace "system" with -- generator --

At Column 18, Claim number 30, Line number 1, please replace "system" with -- generator --

At Column 18, Claim number 32, Line number 1, please replace "system" with -- generator --

At Column 18, Claim number 33, Line number 1, please replace "system" with -- generator --

At Column 20, Claim number 35, Line number 1, please replace "system" with -- generator --

At Column 20, Claim number 36, Line number 1, please replace "system" with -- generator --

Signed and Sealed this  
Eighth Day of September, 2020

Andrei Iancu  
*Director of the United States Patent and Trademark Office*